Nov. 22, 1927.
S. L. HANSSEN
1,650,349
SCALE
Filed June 4, 1925
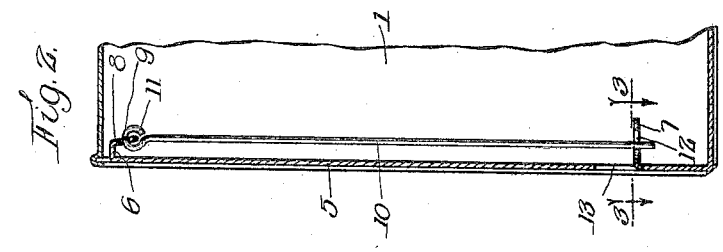
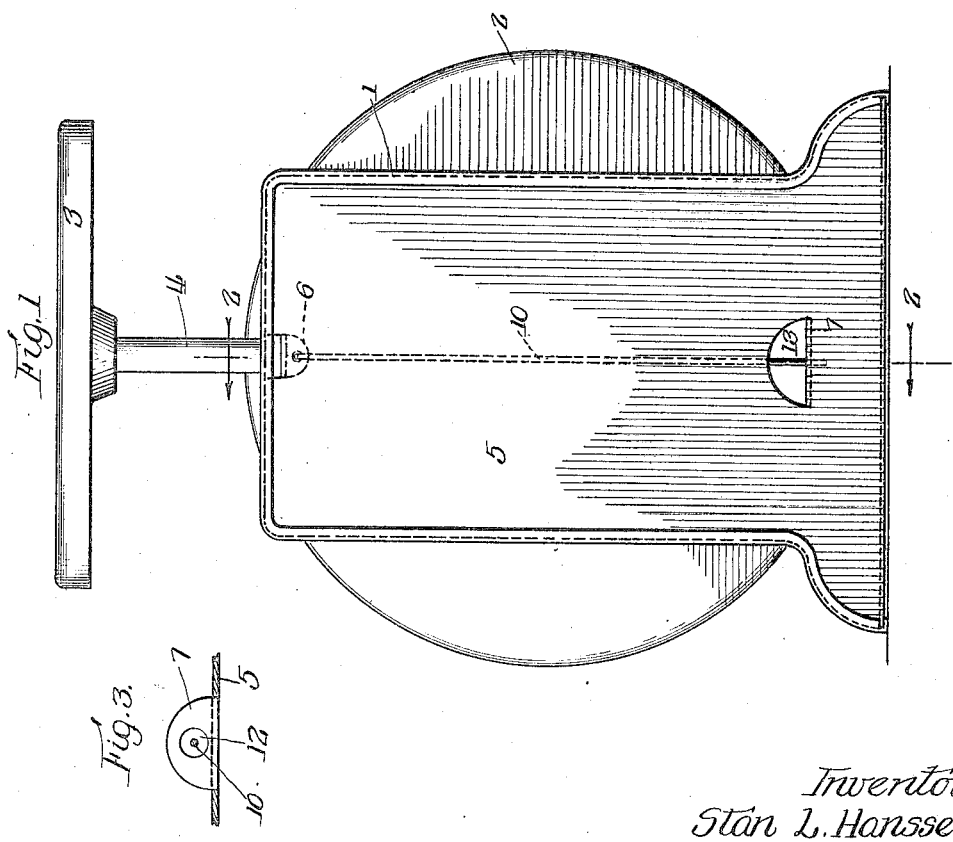
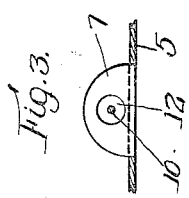
Inventor:
Stan L. Hanssen, Patented Nov. 22, 1927.

1,650,349

UNITED STATES PATENT OFFICE.

STAN L. HANSSEN, OF CHICAGO, ILLINOIS, ASSIGNOR TO HANSON BROTHERS SCALE COMPANY, OF CHICAGO, ILLINOIS, A CORPORATION OF ILLINOIS.

SCALE.

Application filed June 4, 1925. Serial No. 34,781.

My invention relates more particularly to portable spring-actuated scales of the platform type.

Scales of this type as a rule embody a parallelogram arrangement of levers and a spring constituting the scale mechanism and it is necessary that the scale stand level in order that the entire weight of the object on the scale platform be effective to actuate the scale mechanism. When the scale is tilted the force exerted by the weight resolves itself into two components, one in the plane of the scale platform and the other perpendicular thereto, the component in the plane of the platform being ineffective upon the mechanism. Because of this ineffective component of the weight a constant error in the indications will result when the scale does not stand level. Such an error, although it may be comparatively small as to each article weighed, may reach appreciable proportions when many articles are weighed. For example, if the scale is used for weighing postal matter in large quantities a small error in the weight of each article may involve a considerable amount of postage.

It is the object of my invention to provide a scale having simple mechanism to indicate when the scale stands level.

Other objects and advantages of my invention will become apparent from the following description taken in connection with the accompanying drawings, in which—

Figure 1 is a rear elevation of a spring-actuated platform scale embodying one form of my invention.

Fig. 2 is a sectional view taken along line 2—2 of Fig. 1, looking in the direction of the arrows.

Fig. 3 is a sectional view taken along the line 3—3 of Fig. 2 looking in the direction of the arrows.

Referring to the accompanying drawings, my invention, in the form illustrated, is shown embodied in a platform scale comprising a casing designated generally as 1, a dial 2 and a platform 3 attached at the top of a post 4 which engages suitable internal mechanism (not shown).

The casing 1 which is preferably of metal comprises a vertical rear wall 5 having thereon two inwardly punched lugs 6 and 7, one above the other. The upper lug 6 is bent inwardly and then downwardly, the downwardly bent portion 8 being provided with a hole 9 therethrough. A slender rod 10, of non-magnetic material, having an eye 11 at its upper end is suspended from this lug 6 to swing freely therefrom so as to be under the influence of gravity. The lower lug 7 is bent inwardly in a horizontal plane, and is provided with a hole 12 therethrough so positioned that when the scale stands level the rod 10 will hang centrally through this hole 12.

As will be apparent from Figs. 1 and 2 the position of the rod 10 in the hole 12 is visible from the outside of the casing through an aperture 13 remaining in the wall of the casing as a result of punching the lug 7 therefrom. Thus by punching the lug from the casing wall a guide is formed for surrounding the rod 10 and means is provided by which the position of the rod 10 in the hole 12 is visible from outside of the casing.

It will be seen from the foregoing that I have provided a scale with simple and effective means to give a visible indication when the scale stands level.

I claim as my invention:

A portable scale having, in combination, a sheet metal casing, a non-magnetic rod suspended within the casing to swing freely, and a lug punched inwardly and downwardly from a wall of the casing into a horizontal plane, thereby leaving an aperture in the said wall, said lug having a hole therethrough so positioned that when the scale stands level the lower end of said rod will pass centrally through said hole and be visible from without the casing through said aperture in the casing wall.

In testimony whereof, I have hereunto affixed my signature.

STAN L. HANSSEN.